Aug. 19, 1969   T. F. BOMBERO   3,461,553
RIBBON-TYPE RAZOR WITH A SPECIFIC TYPE SPOOL
Filed Aug. 12, 1966   8 Sheets-Sheet 7

United States Patent Office 3,461,553
Patented Aug. 19, 1969

3,461,553
RIBBON-TYPE RAZOR WITH A SPECIFIC TYPE SPOOL
Thomas F. Bombero, Shelton, Conn., assignor to Eversharp, Inc., Milford, Conn., a corporation of Delaware
Filed Aug. 12, 1966, Ser. No. 576,497
Int. Cl. B26b 21/26; B65h 75/28
U.S. Cl. 30—40.1                                    7 Claims

ABSTRACT OF THE DISCLOSURE

A ribbon-type razor having at least one blade spool which includes a principal body portion, a slot defined by a side wall on the body portion and a movable side wall portion which may be moved into a position parallel with the side wall portion on the body. A tooth-like projection, in position of use, extends between the side walls defining the slot and through an aperture in the blade. Preferably, a spool is molded with the movable side wall portion in an open position, the blade is moved into registry with the projection, and the movable side wall is folded to a position adjacent the body, thereby defining a slot for the blade, while the projection serves to lock the movable side wall to the other portion of the body and hold the blade in place. The projection is preferably elongated and disposed away from the center line of the slot.

---

This invention relates to improvements in ribbon-type safety razors and more particularly is directed towards new and improved supply and take-up spools for use in a ribbon-type safety razor.

Safety razors which use a thin ribbon-like razor blade for shaving are well known in the art. In some types, the opposite ends of the thin ribbon-like razor blade are joined to supply and take-up spools respectively through the use of a metal clip which is joined to the leading and trailing ends of the ribbon-like razor blade. Each of the spools is provided with a cross slot, which in elevation appear to be a chord of the circle formed by the outline or drum of the spool onto which the blade is wound. A restricted or narrow portion is formed at one end of the cross slot and engages the metal clip on the end of the ribbon-like blade to prevent it from being completely pulled through the slot when tension is applied as occurs in winding.

At assembly, the ribbon-like blade is wound on the supply spool with a part of the leading end of the blade positioned across a shaving area or bridge on the razor where it is clamped for shaving. The terminal part of the leading end of the blade is attached to the take-up spool in the manner described above. As the blade becomes dull, it is wound on the take-up spool to expose an unused sharp portion on the shaving bridge. Since the ribbon-like blade is very thin (i.e. about 0.0015 inch) problems are encountered in handling it during manufacture and assembly and also in maintaining the blade properly located on the shaving bridge. Various means have been proposed to obviate these problems, however, up to the present invention the problems associated with handling during manufacture and assembly have continued to exist. The problems arising in connection with blade positioning and clamping have been solved to a certain degree, however certain areas have ample room for improvement as will be seen.

The present invention relates to novel spool constructions which may be expediently and easily assembled to the thin ribbon-like blade for greater ease in blade handling during manufacture and assembly. The spools are so constructed that the pulling force is applied to the blade along the rearward or unsharpened edge to also provide assistance in blade positioning on the shaving bridge. The novel design of the spools is conducive to manufacture by such mass production techniques as injection molding and the like with the resultant effect on the cost of manufacture. In one specific supply spool design, a blade severing punch performs the blade cutting function simultaneously with attachment to the thin ribbon-like blade. Other advantages of the present invention will become apparent when the objects and description of a preferred embodiment are considered.

It is an object of this invention to provide a new and improved spool arrangement in a ribbon-type razor.

It is a further object of this invention to provide a new and improved spool construction particularly adapted to provide a pulling force adjacent one margin of the ribbon-type blade.

It is a further object of this invention to provide a new and improved spool construction which permits easy assembly of the razor blade to the spool without requiring special adapters, clips or the like.

It is a further object of this invention to provide a spool construction having movable hinged portions to permit easy attachment of a thin ribbon-like razor blade thereto.

It is a further object of this invention to provide a novel spool construction particularly adapted for attachment to a ribbon-like razor blade and including cutting means mounted on the spool to sever the ribbon-like blade on attachment to the spool.

It is a still further object of this invention to provide a new and improved spool arrangement having a portion thereof hinged to facilitate assembly to a ribbon-like razor blade and including locking means positively locking the hinged portion to the remainder of the spool after insertion of the razor blade.

Other objects than those enumerated above will become apparent on consideration of the drawings and following description of representative embodiments.

Figures 1, 2:
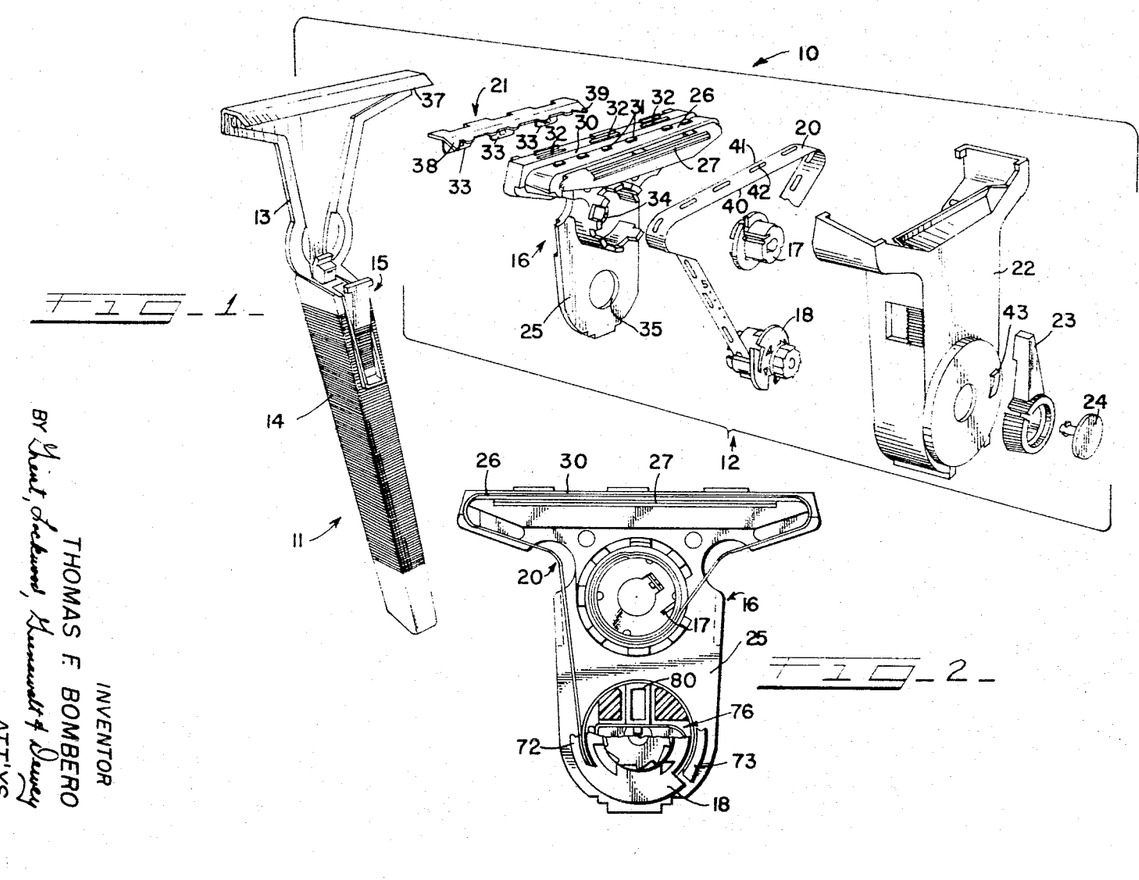
FIG. 1 is an exploded perspective view of a ribbon-type safety razor embodying the principles of the present invention.
FIG. 2 is a front elevational view of the magazine of the safety razor shown in FIG. 1 with the cover removed, and the novel spools and ribbon-type blade installed.

In the exploded perspective view of FIG. 1, a safety razor 10 is illustrated including a magazine holder 11 and a disposable razor magazine 12. The magazine holder 11 consists of a frame 13 supported by a handle 14 having a suitable locking lever 15 mounted adjacent the upper end which functions to lock the magazine 12 in the holder 11 for shaving. The details of the holder may be found in the United States application, Ser. No. 501,477, filed Oct. 22, 1965 relating to a safety razor of the type herein disclosed and of which application I am a co-inventor.

The razor magazine includes a magazine body 16 for mounting a supply reel 17 and take-up reel 18 which are novelly constructed for joining to the opposite ends of a ribbon-type blade 20. Also included in the basic elements forming the razor magazine 12 are a clamping spring 21 for use in positioning the razor blade, a magazine cover 22, and advancing lever 23 and a fastening button 24.

When viewed in front elevation, the magazine body 16 is of generally T-shaped configuration having a base portion 25 and shaving bridge portion 26 terminating in a guard 27. The rearward portion of the bridge 26 is formed with a shoulder 30 for guiding the razor blade 20 as it is moved across the bridge 26. A plurality of lugs 31 serve as guides for the razor blade as is described in the application mentioned above. The rearward part of the shaving bridge is provided with a plurality of openings 32 to receive lugs 33 on the spring 21 for mounting.

The base 25 is provided with a mounting area 34 for the supply spool 17 and a mounting opening 35 for the take-up spool 18 with the parts being mounted as shown in FIG. 2 with the spring 21, magazine cover 22, advancing lever 23 and fastening button 24 omitted.

The ribbon-like blade 20 is provided with a sharpened edge 40 and a rearward blunt edge 41. A plurality of apertures 42 are formed in the blade at uniformly spaced intervals and serve to guide and hold the blade in position. Suitable indicia in the form of consecutive digits may be provided at uniformly spaced intervals to divide the blade into identifiable sections of uniform length for disposition on the shaving bridge. The apertures 42 are formed closer to the rearward or blunt edge of the blade 20 and co-operate with the novel spools 17 and 18 to provide blade tensioning in a manner to be described in greater detail.

The magazine cover 22 is constructed as described in the copending application alluded to above, and includes a stop member 43 to limit the clockwise movement of the advancing lever 23.

The spring 21 is provided with a scalloped edge as described in the copending application described above. The ends of the spring 21 are provided with ears 38 and 39 which extend over the bridge a sufficient distance so that the apertures 42 in the razor blade 20 are covered. This prevents the clamping edge 37 of the frame 13 on the holder 11 from accidentially entering the apertures at the end of the bridge 26 and tearing the blade 20 when the magazine is inserted.

Referring now to FIGS. 4–7, the supply spool 17 includes a cylindrical drum portion 45 adapted for coiling the ribbon blade 20 thereon. The drum 45 is provided with a semi-circular bore 46 having the ends joined to a slot or key-way 47 through shoulders 48 and 49. At the rearward end of the bore 46 is mounted an axially projecting bearing 50 formed of bearing sections 51, 52, 53 and 54 positioned around the bore 46. The bearing sections are flexible for ease of assembly into the bearing mounting opening 34 in the magazine base 25 shown in FIG. 1, and to provide some resistance to rotation for blade tensioning. A radially extending guide flange 55 is formed at the rearward end of the drum 45 and when mounted rests on the base 25 of the magazine 16.

Figures 3, 4, 7:
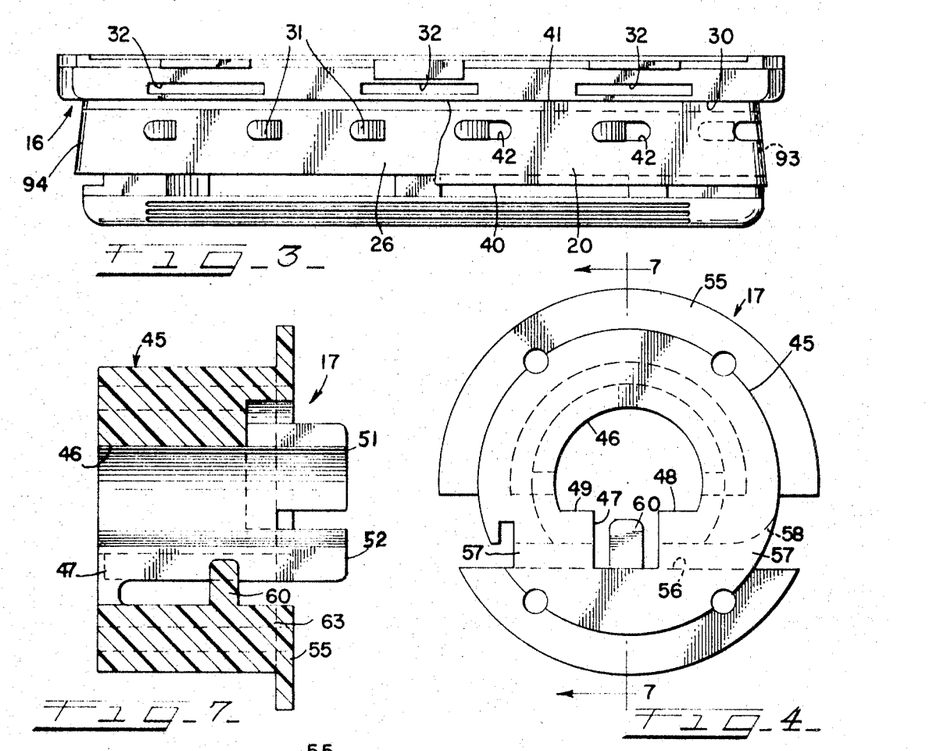
FIG. 3 is an enlarged top plan view of the magazine in FIG. 2 with the ribbon-type blade broken away on the left-hand portion.
FIG. 4 is an enlarged front elevational view of the supply spool shown in FIG. 1.
FIG. 7 is a cross sectional view taken generally along the lines 7—7 of FIG. 4.
Figures 5, 6:
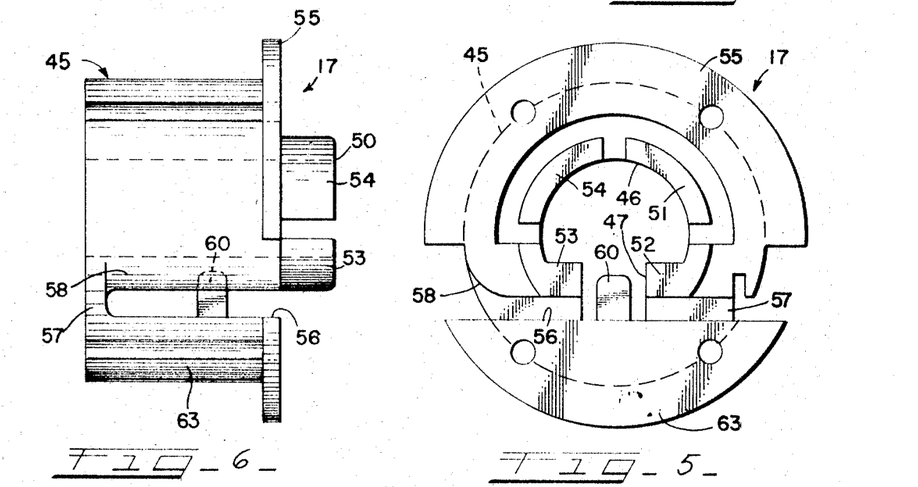
FIG. 5 is a rear elevational view of the spool of FIG. 4.
FIG. 6 is a side elevational view of the spool shown in FIGS 4 and 5.

As best seen in FIGS. 5 and 6, a chord-like slot 56 extends axially through the guide flange 55 and substantially through the drum 45 being connected by a thin hinge portion 57. The chord-like slot 56 merges with the surface of the drum through an arcuate section 58 which prevents the blade from being bent too sharply as it extends to the circumferential portion of the drum. The key-way or slot 47 is provided with a tooth-like projection 60 which is disposed centrally of the key-way 47 in a transverse direction, however, as seen in FIGS. 6 and 7, in an axial direction is positioned closely adjacent the guide flange 55 for reasons to be explained. The tooth-like projection 60 is formed integral with tab-like section 63 supported from the main body portion of the drum 45 through the hinge section 57.

Figure 14:
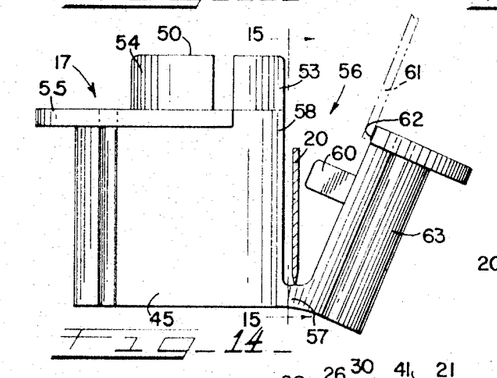
FIG. 14 is a side elevational view of the supply spool shown in detail in FIGS. 4–7 with a portion of the spool deflected to admit the ribbon-type blade shown in section.
Figure 15:
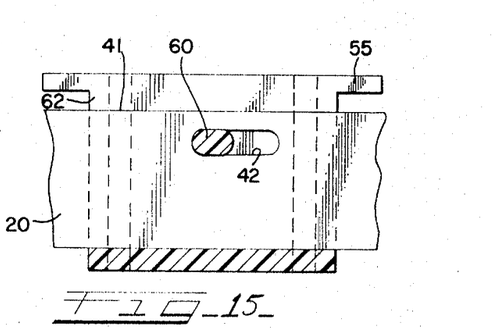
FIG. 15 is a view taken generally along the lines 15—15 of FIG. 14 after the tool is released and the tooth on the spool is interfitted with an aperture in the ribbon-type blade.

Referring now to FIG. 14, the supply spool 17 is illustrated with a blade 20 shown in cross section positioned in the chord-like slots 56. In order to facilitate installation, a suitable tool shown fragmentarily in phantom at 61 engages the side 62 of the slot 56 and deflects the tab-like section 63 about the hinge section 57 to open the mouth of the slot 56. A ribbon-like blade of the type shown in FIG. 1 is inserted into the slot and the tool may then be removed to release the tab 63 for flexing to its original position. As shown in FIG. 15, the tooth-like projection 60 projects through the aperture 42 in the ribbon-like blade 20 to join the supply spool and blade 20 thereby permitting the blade to be wound around the drum 45. While the aperture 42 has been shown as of elongated shape, it may be of any suitable design which will co-operate with the tooth-like projection 60 to maintain the blade installed on the supply spool 17.

As is evident from the illustration in FIG. 15, the pulling force is applied to the blade 20 adjacent the rearward edge 41. This co-operates with the bridge to assist in proper blade tensioning for comfortable shaving as will be described in conjunction with FIG. 3. Obviously, the location of the aperture 42 and the tooth-like projection can vary if other means of tensioning the blade are utilized.

Figure 8:
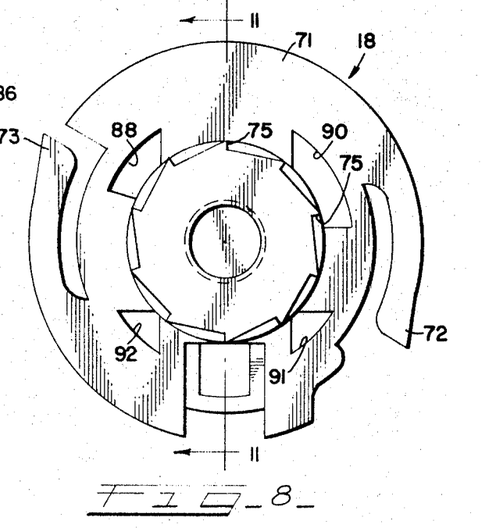
FIG. 8 is an enlarged front elevational view of the take-up spool shown in FIG. 1.
Figure 9:
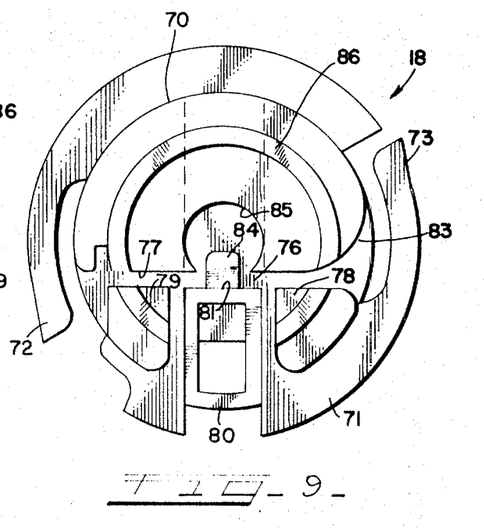
FIG. 9 is a rear elevational view of the spool shown in FIG. 8.

Referring now to FIGS. 8–11, details of the take-up spool 18 will be described. In practice, the take-up spool 18 is of greater size than the supply spool. It includes a drum-like portion 70 provided with a guide flange 71 which as seen in FIGS. 8 and 9, is formed to include diametrically positioned radially flexible pawl members 72 and 73. The pawl members 72 and 73 co-operate with ratchet teeth formed inside the magazine 22 to limit rotation of the take-up reel only to the direction which pulls the blade from the supply reel. Outwardly of the guide flange 71, the take-up reel is formed to a section 74 of reduced diameter which is provided with a series of ratchet teeth 75. These teeth co-operate with the pawl member carried in the advancing lever 23 providing for the lever to rotate the take-up spool 18 as the lever 23 is moved in a counterclockwise direction. The details of the ratcheting arrangement are fully described in the co-pending application mentioned above and the disclosure of that application is incorporated herein by reference.

The drum 70 is also provided with a bearing portion 86 at its inner end which is of reduced diameter and coaxial with the drum. The bearing portion 86 is appropriately dimensioned so as to be received in the opening 35 in the base 25 with a reasonably tight but rotatable fit for good blade tensioning.

Figure 10:
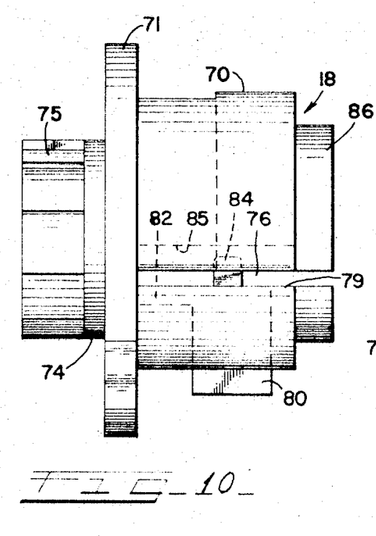
FIG. 10 is a side elevational view of the spool shown in FIGS. 8 and 9.
Figure 11:
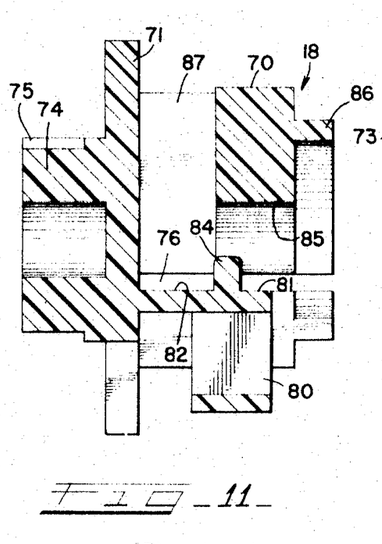
FIG. 11 is a cross sectional view taken generally along the lines 11—11 of FIG. 8.

As best seen in FIGS. 9–11, a slot 76 is formed through one end of the drum and extends inward to the guide flange 71. When the spool is viewed in front elevation, the slot 76 appears as a chord of the circle formed by the circumferential surface of the drum 70. One side wall 77 of the slot is bounded by the largest part of the drum proper while the opposite side is made up of individual drum sections 78 and 79 disposed on opposite sides of a flexible tab member 80 having an inner wall portion 81 substantially coextensive with the walls of the sections 78 and 79.

The flexible tab 80 is joined through a flexible hinge section 82 to the guide flange 71 to permit resilient flexing of the tab 80 away from the slot 76. The wall portion 77 merges with the surface of the drum through an arcuate section 83 to permit the leading portion of the ribbon-like blade to extend out of the slot 76 onto the drum 70 on which it is wound after the section of blade disposed on the shaving bridge is expended.

A tooth-like projection 84 extends from the inner wall 81 of the tab 80 across the slot 76 partly into a cylindrical bore 85 through the drum 70. The tooth-like projection is offset axially from the geometric center of the drum 70, being spaced from the guide flange 71 a sufficient distance to allow the razor blade 20 to be wound on the drum 70 when the tooth-like projection is positioned in one of the apertures 42. A rectangular opening 87 extends radially through the drum 70 to intersect with the cylindrical bore 85, such opening providing for easy handling during manufacture of the spool 18. Similar openings 88, 90, 91 and 92 are provided through the guide flange 71 as seen in FIG. 8 to permit the molded part to be more precisely shaped and avoid distortion during molding and cooling.

Figure 12:
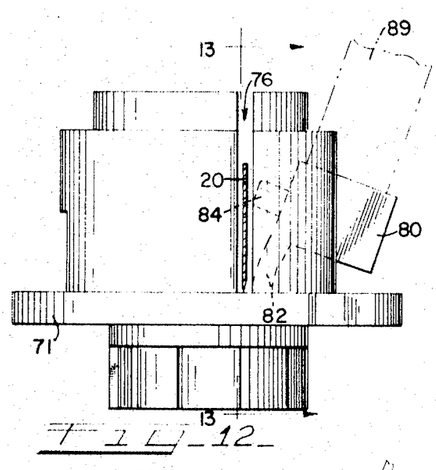
FIG. 12 is a side elevational view of the spool shown in FIGS. 8–11 with a tool (shown in phantom) inserted to deflect a portion of the spool to permit insertion of a ribbon-type blade shown in cross section.

As seen in FIG. 12, the take-up spool is indicated in elevation with the blade 20 disposed in the cross slot 76 and the tab 80 flexed by a suitable tool, shown fragmentarily in phantom at 89, to move the tooth-like projection 84 out of the slot 76. The razor blade 20 is inserted with the sharpened edge engaging the guide flange 71 to promote further dulling of the blade after use and thus protect against injury should the used magazine be disassembled. Once the tool 89 is removed, the flexible tab 80 urges the tooth-like projection 84 into one of the apertures 42 in the blade 20. Subsequent rotation of the take-up spool 18 causes the blade to wind about the arcuate section 83 and onto the drum 70 where it is wound upon itself in a coil for compact storage. After the razor blade 20 has encircled the drum 70 one full turn, it urges the flexible tab 80 inward so that the inner wall 81 is forced with the blade 20 toward the walls 77 of the slot 76 to maintain the tooth-like projection 84 securely positioned in the aperture. This effect is caused because the radial dimension of the outer circumferential portion of the flexible tab 80 is greater than the radius of the drum 70, the contrast being most evident in the side elevational view of FIG. 10, providing for securely holding the blade.

As seen in FIG. 2, the ribbon-like razor 20 is wound onto the take-up spool 18 by pulling it across the bridge 26 and unwinding it from the supply spool 17. The configuration assumed by the blade 20 in FIG. 2 between the ends of the bridge and the respective spools is attributable to the blade resting on guide shoulders (not shown) formed in the magazine cover 22. The take-up spool and supply spool assist in tensioning the cutting edge of the ribbon-like blade 20 for proper positioning on the shaving bridge.

Figure 16:
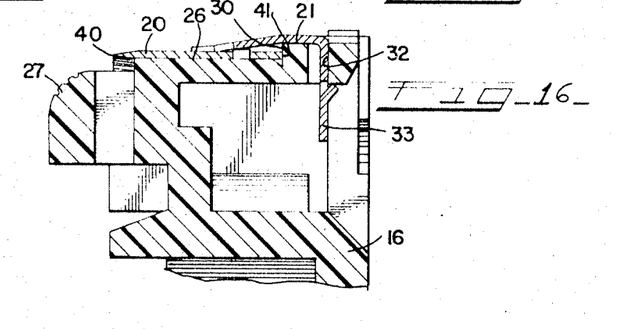
FIG. 16 is an enlarged cross sectional view of the upper portion of the magazine before insertion into the holder shown in FIG. 1.

As seen in FIGS. 3 and 16, the blunt edge 41 of the blade 20 engages the guide shoulder 30 on the bridge 26. The guide lugs 31 engage the apertures 42 in the blade 20 to assist in guiding the blade across the bridge 26. The opposite ends of the bridge are tapered rearwardly forming in top plan view inclined surfaces 93 and 94 of a wedge-like configuration. The tension applied to the blade 20 causes the blade to be driven rearwardly against the guide shoulder 30 due to the shape of tapered or relieved surfaces 93 and 94. An alternate form of this construction is shown on the application alluded to previously, however, in the present application, the inclined surfaces are formed of a solid surface from front to back rather than having the guide land adjacent the front of the bridge only.

The location on the tooth-like projections on the flexible tab members of the supply and take-up spools 17 and 18, respectively, is such that the pulling force is transmitted closer to the blunt edge 41 of the blade 20 than the sharpened edge, contributing to the proper locating of the ribbon-like razor blade 20 to insure that the sharpened edge 40 will be properly tensioned for shaving comfort. A more detailed discussion of this concept dealing with the wedge-like action of the bridge may be found in the copending application mentioned above.

Figure 13:
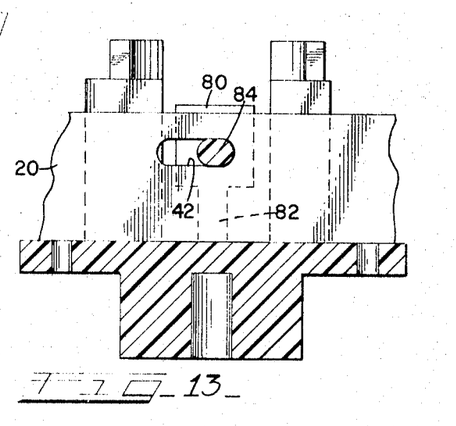
FIG. 13 is a cross sectional view taken generally along the lines 13—13 of FIG. 12 after the tool has been removed and the tooth on the spool is interfitted with an aperture in the blade.

The transverse or axial location of the apertures in the blade is chosen to provide the pulling force along one edge and to automatically register with the tooth-like projections 84 and 60, as shown in FIGS. 13 and 15, respectively, when one edge of the blade is seated or engaged with the axial and wall of the slot (FIGS. 12–15) to facilitate easy locating during assembly of the blade to the spool.

Figure 17:
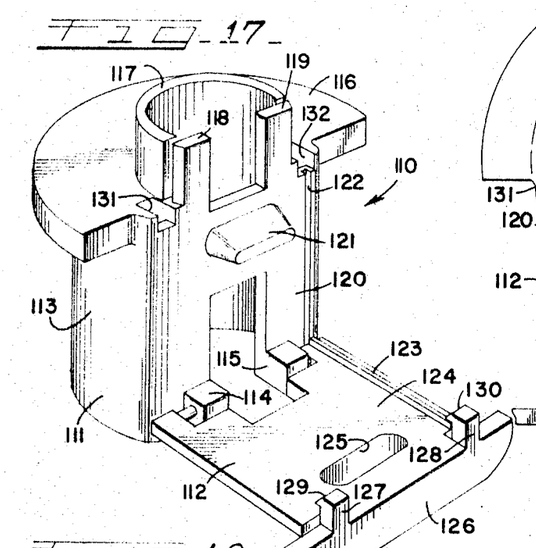
FIG. 17 is a perspective view of a modified form of spool with a hinged movable portion of the spool being shown in the open position.
Figure 18:
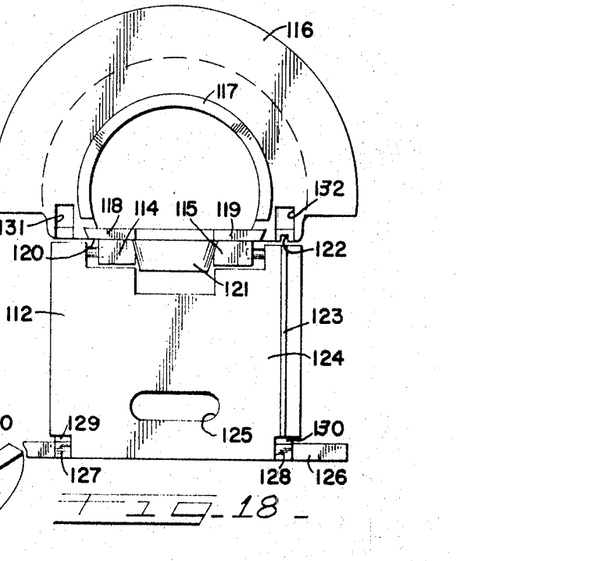
FIG. 18 is a top plan view of the spool shown in FIG. 17.

Referring now to FIG. 17, a modified form of supply spool is indicated generally at 110 and includes a cylindrical drum portion 111 adapted for coiling a ribbon-like blade thereon. The supply spool 110 includes a movable portion 112 joined to the main body portion of the spool 113 through hinges 114 and 115.

The supply spool 110 includes a radially extending guide flange 116 on the main body portion 13 which is adapted to rest on the base 25 of the magazine 16 when installed in the razor assembly shown in FIG. 1. On the rearward side of the guide flange 116 is provided bearing sections 117, 118 and 119 which generally correspond to the bearing sections 51–54 in the supply spool of FIG. 7.

The main body portion 113 of the supply spool 110 is provided with a generally flat side wall 120 in the form of a chord extending across the cylindrical drum portion. The side wall 120 is provided with a tooth-like projection 121 integrally joined to the main body of the spool 110. The tooth-like projection 121 includes a base portion which approximates the size of the apertures 42 in the ribbon-like blade 20, while the free end is slightly smaller to facilitate easy location in the aperture 42 during assembly of the ribbon-like blade to the spool 110.

Adjacent the intersection of the side wall 120 with the arcuate drum portion 111 is formed a longitudinally extending groove 122 forming a die to receive a longitudinally extending punch 123 carried on the movable portion 112. The movable portion 112 includes a side wall 124 having an aperture 125 formed therein to receive the free end of the tooth-like projection 121 in the manner shown in dotted lines in FIGS. 19–21 when the side walls are brought into parallelism to form the cross slot to receive the ribbon-like blade. The free end of the tooth-like projection 121 is of lesser size than the base to facilitate entry into the apertures in the blade 20.

At the top of the side wall 124 a flange 126 is formed which in the closed position is generally coextensive with the guide flange 116 and assists in holding the ribbon-like blade coiled on the drum 111. On the inner side of the flange 126 is formed a pair of locking lugs 127 and 128 having sloped surfaces 129 and 130 which cause the locking lugs 127 and 128 to be cammed into co-operating openings 131 and 132 formed at the top of the side wall 120 thereby locking the side walls 120 and 124 in parallel relation.

Figures 19, 20, 21:
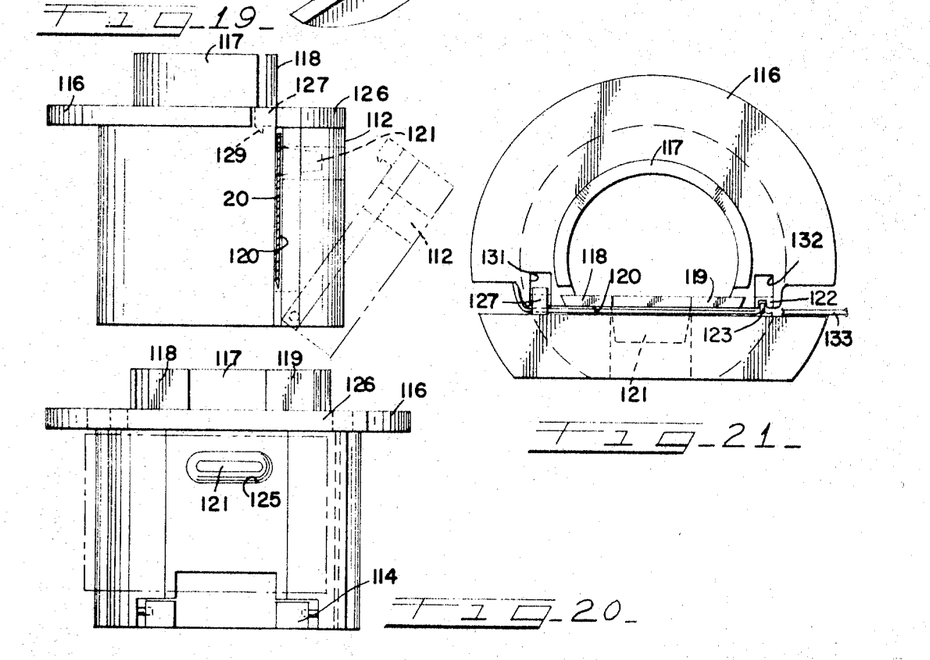
FIG. 19 is a side elevational view of the spool shown in FIGS. 17 and 18 with the hinged portion shown in phantom lines in an intermediate position during closure and shown in solid lines after fully closed with the ribbon-like razor blade shown in cross section.
FIG. 20 is a front elevational view looking at the hinged portion.
FIG. 21 is a top plan view similar to FIG. 18, however, illustrating the hinge portion immediately after closing to sever the ribbon-like razor blade.

The ribbon-like blade 20 in FIG. 1 may be readily assembled to the supply spool 110 by positioning the side wall surface 120 in horizontal plane and then locating the aperture 42 in the blade 20 over the free end of the tooth-like projection 121. After the blade has been located on the tooth-like projection as shown in FIG. 21, the side wall 124 on the movable portion 112 is brought up into parallel relation with the side wall 120 at which time the camming surfaces 129 and 130 cause the locking lugs 127 and 128 to be locked in the respective openings 131 and 132. For convenience, the locking lug 128 has been removed in FIG. 21 in order to illustrate the inter-fitting of the longitudinal punch 123 within the die groove 122 which, upon closing of the movable portion 112 into adjacent relation to the drum portion 111 of the spool 110, to their respective assembled positions, simultaneously causes a cutting off of the portion 133 of the end of the blade 20 which is not held in place between the drum portion 111 and the movable portion 112 of the supply spool 110. The severed portion 133 may be held on a take-up spool (not shown) attached to one end of the preceding length of blade. During movement of the movable portion 112 into locking relation the blade is held properly positioned on the tooth-like projection until such time the free end thereof is received in the opening 125 in the side wall at 124. After the movable portion has been locked to the main body portion of the spool 110, the blade 20 is positively locked against further movement as is apparent in FIGS. 19 and 20.

The supply spool 110 has the advantage of having a movable portion 112 which freely opens to expose the free end of the tooth-like projection and permit the ribbon-like blade 20 to be easily inserted between the movable portion 112 and the drum portion 111 of the spool 110 during assembly of the blade 20 and the spool 110. Since the tooth-like projection 121 is contained on the non-movable side wall, it serves as a locating means to positively hold the blade properly positioned during assembly of the spool 110 and the blade 20 while the movable portion 112 is brought to the closed position simultaneously severing the ribbon-like blade 20 and positively locking it to the supply spool 110, where it may be coiled for storage.

Detailed views of a modified form of take-up spool 140 are found in FIGS. 22–25. The take-up spool 140 includes a main body portion 141 and a movable portion 142. The movable portion 142 is joined through hinges 143 and 144 to the main body portion in a manner similar to the movable portion 112 on the supply spool 110. The main body portion 141 is provided with a drum-like surface 145 adapted to receive the ribbon-like blade 20 as it is expended. At one end of the drum-like surface 145 is provided a guide flange 146 having movable pawl members 147 and 148 adapted to co-operate with ratchet teeth formed in the magazine 22 in the manner described with the take-up spool 18. Axially of the guide flange 146, the take-up spool or reel 140 is formed to a section of reduced diameter 150 having a plurality of ratchet teeth 151 which correspond to the ratchet teeth 75 on the take-up spool 18 described above. These teeth are adapted to co-operate with the pawl members carried in the advancing lever 23 to permit unidirectional movement.

At the opposite axial end of the take-up spool 140 is formed a bearing portion 152 which is of reduced diameter relative to the drum-like portion 145, being adapted to be received in the opening 35 in the base 25 of the magazine with a rotatable fit. The drum-like surface 145 is interrupted by a flat side wall portion 153 which extends from the bearing end of the drum 145 to the guide flange 146. When viewed in the plan view of FIG. 25, the side wall 153 appears as a chord of the circle formed by the circumferential surface of the drum 145.

A tooth-like projection 154 is formed integral with the side wall 153 and has the free end thereof extending completely across the cross slot formed by the side wall 155 on the movable portion 142 and the side wall 153 of the spool 140. An aperture 156 is formed in the side wall 155 and receives the free end of the tooth-like projection 154 when the side wall 155 of the movable portion 142 is brought into parallel relation with the side wall 153. As is apparent in the drawings, the free end of the tooth-like projection is of reduced size relative to the base for easy location in the apertures 42 in the blade 20.

Figures 22, 23, 24, 25:
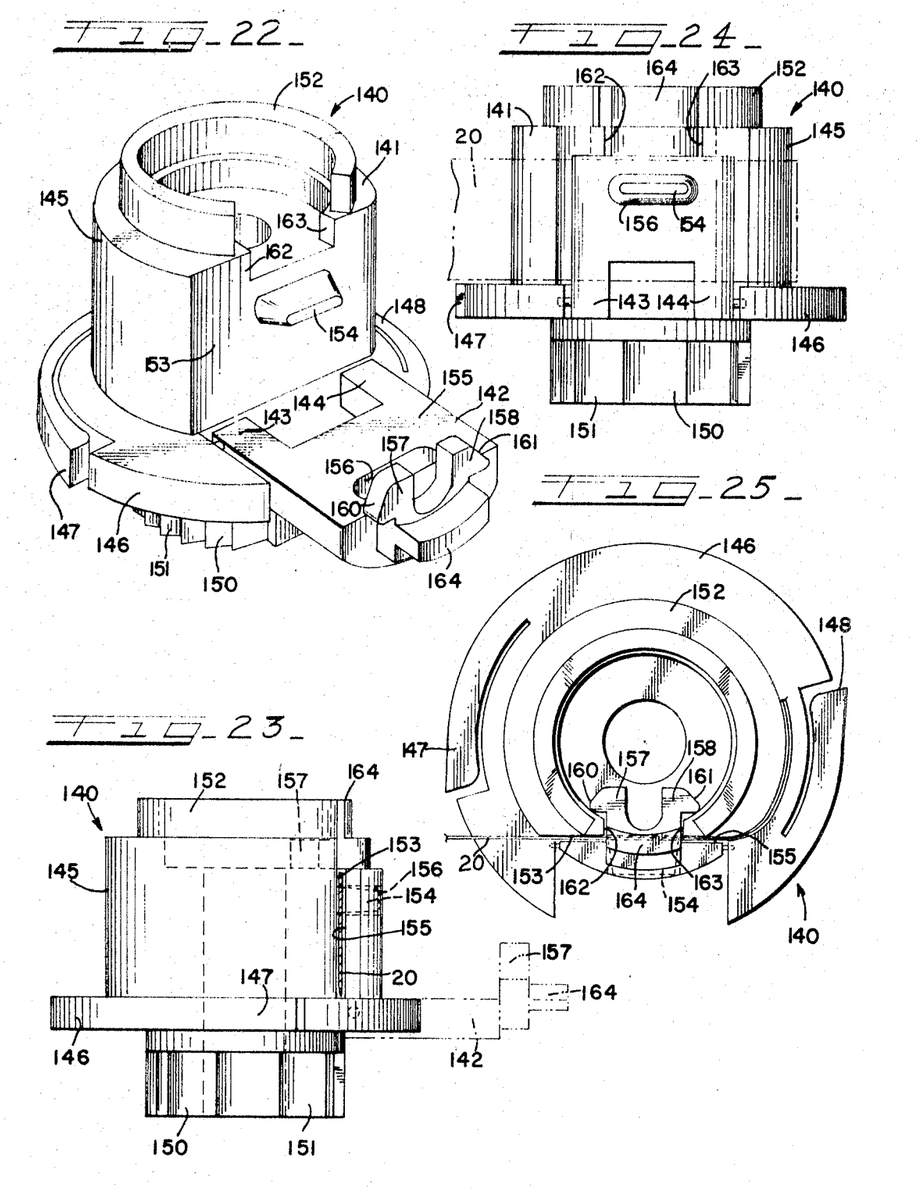
FIG. 22 is a perspective view of a modified form of take-up spool having a hinged movable portion which portion is shown in the open position.
FIG. 23 is a side elevational view of the take-up spool of FIG. 22 after the ribbon-like blade has been attached and the hinged movable portion has been moved from the open position shown in phantom lines to the closed position shown in solid lines.
FIG. 24 is a front elevational view of a hinge portion of the spool of FIGS. 22 and 23 with the razor blade shown in phantom.
FIG. 25 is a top plan view of the spool shown in FIGS. 23 and 24 illustrating the locking means for holding the movable hinged portion closed.

The movable portion 142 includes a pair of locking lugs 157 and 158 having camming surfaces 160 and 161 which are adapted to engage wall portions 162 and 163 on the main body of the take-up spool 140 to cam the locking lugs inward and permit the locking of the movable wall in a vertical position as shown in FIGS. 23 and 25 to form the cross slot to receive the ribbon-like blade 20. At such time a sectional bearing portion 164 is brought into circumferential alignment with the bearing 152 to provide substantially a full 360° bearing surface.

The hinges 143 and 144 on the movable portion 142 may be formed with integral pin-like projections which are adapted for reception in suitable apertures formed in the guide flange 146, these being of conventional design. This hinge construction may be modified or varied as molding and assembly techniques may dictate.

To install the ribbon-like blade 20, one of the apertures 42 is located over the free end of the tooth-like projection 154 and the movable portion 142 is then brough from the position shown in phantom in FIG. 23, to the closed position shown in solid lines, causing the locking lugs 157 and 158 to be cammed in by camming surfaces 160 and 161 entering between the wall portions 162 and 163 and thereby locking the movable portion 142 in the position shown in FIGS. 23–25. At such time the free end of the tooth-like projection 154 is interfitted in the aperture 156 positively joining the ribbon-like blade 20 to the take-up spool 140. The subsequent winding of the ribbon-like blade 20 around the drum 145 also prevents release of the blade should the locking means 157 and 158 fail for any reason.

It is to be appreciated that the hinges 143 and 144 are located relative to the ratchet portions so as to not interfere with the ratcheting action while permitting relative movement between the side wall portions 153 and 155 to permit easy joining of the ribbon-like blade 20 to the take-up spool 140. Once the spool is installed in the magazine, the bearing section 164 on the movable portion 142 provides an additional locking means to maintain the wall portion 142 closed, since, as shown in FIG. 1, a mounting opening 35 is disposed in the base 25, and the spool 140 is supported therein by the bearing 152 on the spool 140 as well as the bearing 164 on the movable portion 142. Thus, in an assembled relation, the movable portion 142 may not move away from the drum-like portion 145 as long as the outer surfaces of the bearing 164 is disposed within and engages the mounting opening 35.

In the supply and take-up spool designs shown in FIGS. 26–35, the hinged or movable portion of the spool is normally open to permit the aperture in the ribbon-type blade to be positioned over the tooth-like projection on the spool. The hinged portion is then movable to the closed position where it is automatically locked to secure the ribbon-like blade to the spool.

Figures 26, 27, 28:
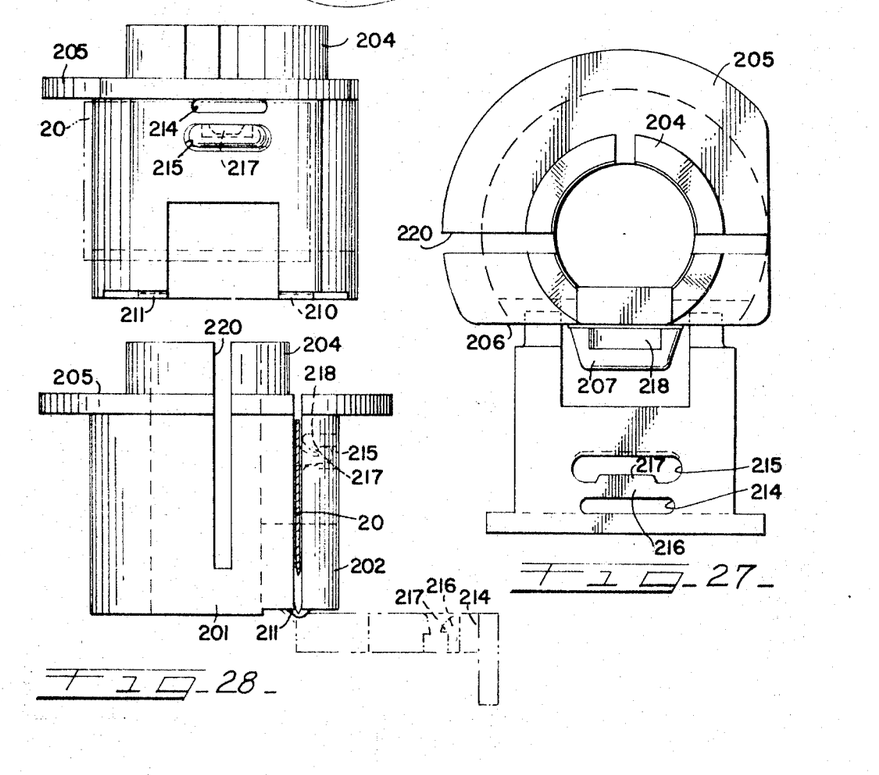
FIG. 26 is a perspective view of a modified form of spool having a modified form of supply spool having a portion hinged for easy attachment to the ribbon-type blade.
FIG. 27 is a top plan view of the spool shown in FIG. 26.
FIG. 28 is a cross sectional view of the spool shown in FIGS. 26 and 27 with the hinge portion illustrated in the open position in phantom lines and in solid lines after it is fully closed and locked to join it to the ribbon-type blade.
Figures 29, 30:
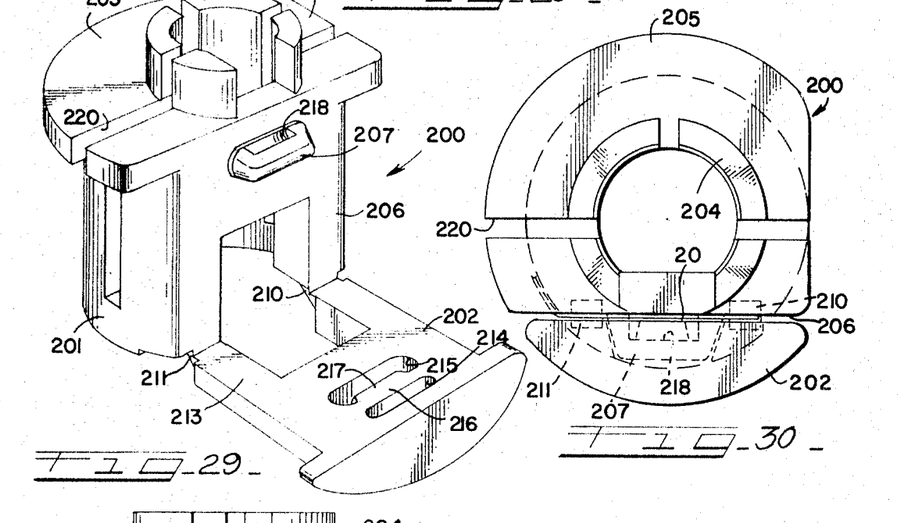
FIG. 29 is a front elevational view of the hinge portion in FIG. 28 with the ribbon-like blade shown in phantom.
FIG. 30 is a top plan view of the spool shown in FIGS. 28 and 29 after joining to the ribbon-like blade.
Figures 31, 32, 33, 34, 35:
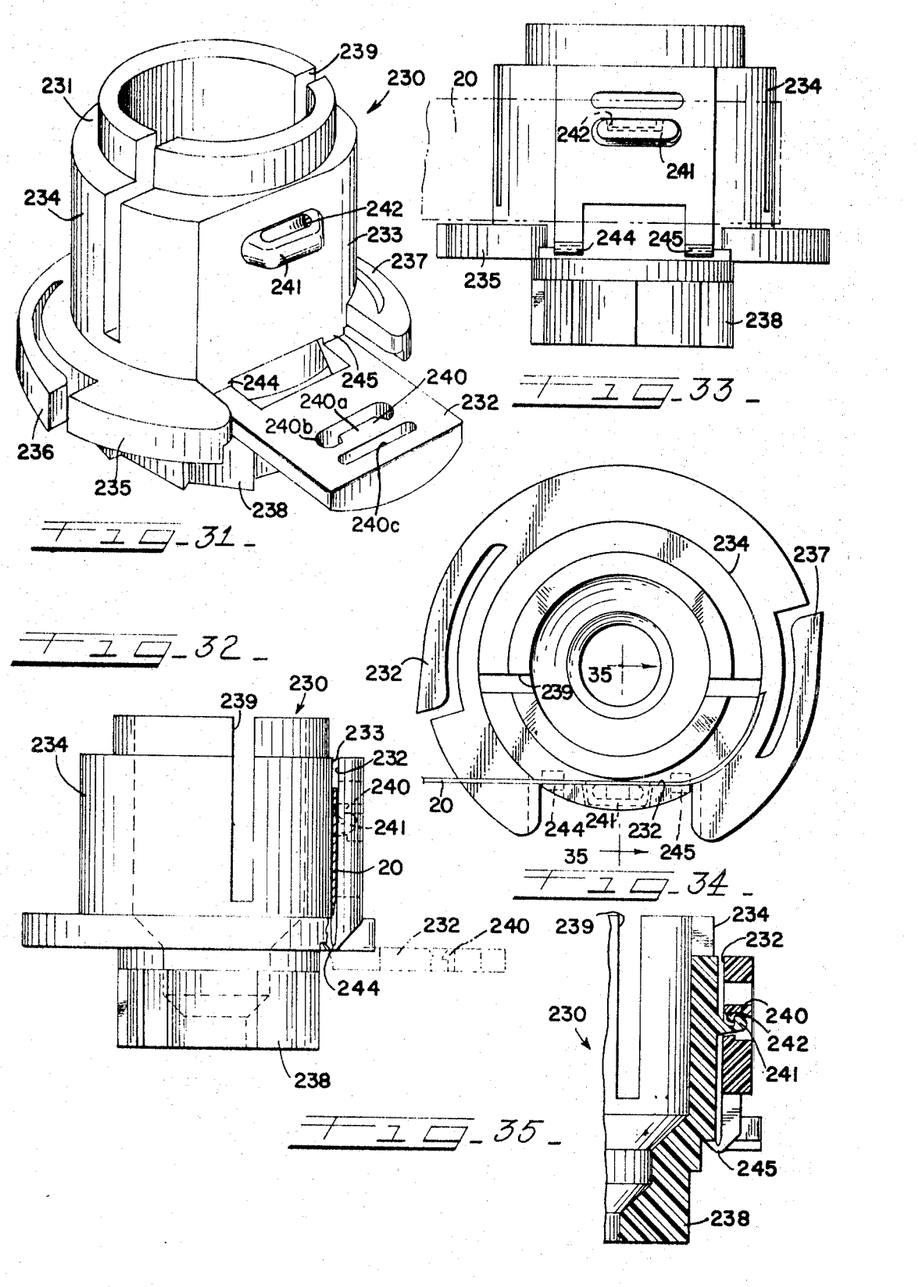
FIG. 31 is a perspective view of a modified form of take-up spool having a portion hinged to permit attachment of the ribbon-like blade.
FIG. 32 is a side elevational view of the spool shown in FIG. 31 with the hinged portion shown in phantom lines in the open position and in solid lines after it is closed and locked to join it to the ribbon-type blade shown in cross section.
FIG. 33 is a front elevational view of the spool shown in FIG. 32 with the ribbon-like blade being shown in phantom.
FIG. 34 is a top plan view of the spool shown in FIGS. 31–33.
FIG. 35 is a fragmentary cross sectional view taken generally along the lines 35—35 of FIG. 34.

The supply spool is indicated generally by the reference 200 in FIG. 26 and includes a cylindrical drum portion 201 adapated to receive the ribbon-like blade 20 for coiling. The supply spool 200 is quite similar in construction to the supply spools previously described insofar as it includes a bearing portion 204 and guide flange 205, however, also includes a slot 220 which facilitates machine handling. The main body portion 201 of the supply spool 200 includes a generally flat side wall 206 provide with a tooth-like projection 207 which has a smaller outer end and a larger base approximating the size of the aperture in the ribbon-like blade 20. The hinged or movable portion 202 is joined through flexible hinges 210 and 211 to the main body 201 of the spool 200.

The movable portion 202 forms a flat side wall 213 which is interrupted by a pair of openings 214 and 215. A wall 216, formed between the openings 214 and 215, is provided with a projection 217 which is adapted to be received in a locking pocket 218 on the outer end of the tooth-like projection 207 when the side walls 206 and 213 are brought into parallel relation. As shown in dotted lines in FIG. 28, this occurs when the movable portion 202 is moved to the closed position with the result that the locking lug or projection 217 is received in the pocket 218 in the tooth-like projection, clamping the razor blade shown in section at 20 between the side walls.

The hinge construction shown at 210 and 211 assumes the general configuration shown in solid lines in FIG. 28 after the movable portion 202 of the spool is locked to the tooth-like projection. Because of the thinness of the hinge at its center, it may be readily flexed during movement of the hinged parts. When the ribbon-like blade is coiled around the drum, the hinged parts are prevented from opening even if they should accidentally become unlocked.

A modified form of take-up spool is indicated generally at 230 in FIGS. 31–35. The take-up spool includes a main body portion 231 having a hinged portion 232 which in the unstressed condition is disposed at right angles to the side wall 233 formed in the spool 230. The spool 230 includes a drum-like portion 234 about which the razor 20 is wound as it is uncoiled from the supply spool when it has been expended. To assist in the winding, a guide flange 235 includes diametrically positioned flexible pawl members 236 and 237 which function in the manner described above. Similarly, ratchet teeth 238 are provided on a section of reduced diameter and function in the manner described with the forms of take-up spools described above.

A cross slot 239 is formed in the center portion of the drum to permit machine handling of the spool for ease of assembly to the apertured ribbon-type blade 20. The hinge portion 232 is provided with a locking finger or lug 240 which is of a configuration similar to the locking lug 217 on the supply spool shown in FIGS. 26–30. The lug 240 is disposed on a portion 240a of the hinge portion 232 which extends between two openings 240b, 240c therein. A tooth-like projection 241 is carried on the side wall portion 233 and is provided with a locking pocket 242 to receive the locking lug 240 in the relation shown in cross section in FIG. 35.

A pair of hinges 244 and 245 join the movable portion 232 to the main body 231 of the take-up spool 230. The hinges 244 and 245 integrally join the main body and movable portion and are of a plastic material with sufficient resilience to permit movement of the movable portion 232 from the phantom line position shown in FIG. 32 to the position shown in solid lines in FIGS. 32–35. In the latter position, the locking lug 240 secures the movable portion in the upright position, and thereafter the ribbon blade may be wound about the drum on the take-up spool to assist in holding the hinged portion in the upright position.

The tooth-like projection on each of the modified forms of supply and take-up spools is located relative to the respective glide flanges to provide the same wedging co-action with the bridge to cause wedging of the ribbon-like blade 20 in a manner similar to the spools 17 and 18. One additional advantage of the latter supply and take-up spools is the ease with which each may be assembled to the blade. This is facilitated by the exposure of the free end of the tooth-like projection through relative movement between the side walls of the cross slot in the respective spools. In addition, the positive locking of the movable portion to the main body portion of the spool assures that the blade and spools will remain as an assembled unit during coiling of the blade, assembly into the magazine and throughout the subsequent consumer use.

From the foregoing description it can be appreciated that the novel spool constructions of the present invention permit the ribbon-like blade to be assembled to one or both of the spools and retained throughout the manufacturing steps, permitting the blade and spool sub-assembly to be handled as a unit. The usual clips on the opposite ends of the blade for attaching to the spools are dispensed with and the unique spool construction provides pulling force on the blade which co-operates with the inclined portions of the bridge to provide good blade tensioning. In the take-up spool design, the drive means is positioned remote from the flexible tab so that the latter does not interfere with the former during blade movement and assembly.

From the foregoing, it will become obvious to those skilled in the art that various modifications may be made without departing from the invention embodied herein. Therefore, only such limitations should be imposed as are indicated by the spirit and scope of the appended claims.

I claim:

1. In a safety razor wherein an elongated apertured ribbon-like razor blade is coiled on supply means and movable across a shaving bridge onto take-up means, the improvement which comprises at least one of said supply and take-up means being in the form of a rotatable spool having two axially facing end portions and being provided with an axially extending cross slot defined by spaced side wall portions, said cross slot extending through and axially inwardly from one of said axially facing end portions, a tooth-like projection extending transversely of said cross slot intermediate the ends thereof, and one of said side wall portions partially defining said cross slot being mounted for movement relative to the other side wall portion to expose a free end of said tooth-like projection permitting said apertured ribbon-like blade to be positioned between said spaced side wall portions for reception of said tooth-like propection into an aperture in said blade thereby to hold said ribbon-like blade to said spool for winding thereon.

2. The improvement of claim 1 wherein said shaving bridge is formed with inclined ends to urge a blunt edge of said razor blade rearward of said shaving bridge and said tooth-like projection is offset a greater axial distance from one end of said slot than the other to apply a pulling force closer to said blunt edge of said ribbon-like blade than the other edge of said ribbon-like blade thereby to assist said inclined ends to urge said ribbon-like blade rearwardly of said shaving bridge for proper tensioning thereof.

3. A safety razor comprising a magazine having a blade supporting bridge with inclined arcuate ends and a guide shoulder on said bridge, a supply spool and a take-up spool mounted for rotation on said magazine, said supply spool having a ribbon-like razor blade coiled thereon and extending across one of said inclined arcuate ends, over said blade supporting bridge and across a second inclined arcuate end for winding onto said take-up spool, said ribbon-like blade having an aperture at least adjacent each of the opposite ends thereof, each of said supply and take-up spools having two axially facing end portions and being provided with an axially extending cross slot therein, said cross slot extending through and axially inwardly from one of said axially facing end portions, a tooth-like projection extending transversely of said cross slot, said tooth-like projection being interfitted into the aperture at each of said opposite ends of said ribbon-like blade to permit said ribbon-like blade to be wound onto said take-up spool from said supply spool thereby pulling said ribbon-like blade across said bridge.

4. The improved safety razor of Claim 1, in which the one of said side wall portions which is mounted for movement relative to said other side wall portion is joined to the remainder of said spool by an integral, inherently resilient hinge and has an upper portion thereof spaced downwardly and away from said one of said axially facing end portions so that said two side wall portions have a substantial included angle therebetween, and in which said movable side wall portion is movable to a position adjacent said other side wall portion against the inherent resiliency of said integral hinge portion, whereby said apertured blade may be assembled by engaging said blade with said tooth-like projection, without forcing said side walls apart from each other.

5. The safety razor of claim 1 in which said tooth-like projection is elongated and has the long axis thereof disposed so as to be parallel to the cutting edge of a blade held on said take-up means.

6. A safety razor magazine comprising a blade supporting bridge, a supply spool and a take-up spool, a ribbon-type blade extending between said spools and over said bridge, at least one of said spools having a principal, generally cylindrical body portion, a body side wall portion located on a part of said body portion, and a movable locking wall portion having an inner side wall surface thereon, said inner side wall surface being disposed at a substantial included angle to said body side wall portion, projection means disposed on one of said locking wall portion and said body wall portion, said locking wall portion being movable into a closely spaced apart, generally parallel relation to said body side wall portion, and wherein said blade is held in place between said portions by engagement of said projection with an aperture in said blade, and wherein said projection serves to hold said wall portions together with said blade held therebetween.

7. The safety razor of claim 4 in which said tooth-like projection engages said portion of said side wall which is mounted for movement to retain said side wall in position adjacent said other side wall.

References Cited

UNITED STATES PATENTS

| | | | |
|---|---|---|---|
| 2,053,642 | 9/1936 | Steinmetz et al. | 30—40.1 |
| 2,137,502 | 11/1938 | Nerwin | 242—74 |
| 3,132,822 | 5/1964 | Arthur | 242—71.8 X |
| 3,262,337 | 7/1966 | Nissen | 76—101 |

FOREIGN PATENTS 377,793 6/1923 Germany.

MYRON C. KRUSE, Primary Examiner

U.S. Cl. X.R.

242—74